United States Patent [19]
Jackson et al.

[11] Patent Number: 5,288,946
[45] Date of Patent: Feb. 22, 1994

[54] STRAIN RELIEF DEVICE AND CLOSURE

[75] Inventors: Jerry D. Jackson; James R. Miller, both of Austin, Tex.

[73] Assignee: Minnesota Mining and Manufacturing Company, St. Paul, Minn.

[21] Appl. No.: 900,610

[22] Filed: Jun. 18, 1992

[51] Int. Cl.⁵ ............................................ H02G 15/02
[52] U.S. Cl. .................................... 174/74 R; 174/38; 174/39; 174/43; 174/78; 174/87
[58] Field of Search ............. 174/74 R, 87, 43, 44, 174/38, 39, 78, 76, 77 R

[56] References Cited

U.S. PATENT DOCUMENTS

| | | | |
|---|---|---|---|
| Re. 27,746 | 8/1973 | Hamilton | 174/38 |
| Re. 27,898 | 1/1974 | Baumgartner | 174/38 |
| 3,431,349 | 3/1969 | Hamilton | 174/38 |
| 3,445,581 | 5/1969 | Barb | 174/138 R |
| 3,725,580 | 4/1973 | Thompson et al. | 174/38 |
| 3,769,443 | 10/1973 | Pierzchala et al. | 174/38 |
| 3,778,749 | 12/1973 | Kapell | 439/411 |
| 3,806,630 | 4/1974 | Thompson et al. | 174/87 X |
| 4,243,834 | 1/1981 | Logioco | 174/38 |
| 4,295,005 | 10/1981 | Daugherty et al. | 174/92 |
| 4,314,694 | 2/1982 | Smith | 174/78 |
| 4,561,708 | 12/1985 | Sorlien et al. | 439/99 |
| 4,620,755 | 11/1986 | Yonkers et al. | 174/78 X |
| 5,059,748 | 10/1991 | Allen et al. | 174/87 |

FOREIGN PATENT DOCUMENTS

WO90/05401 5/1990 PCT Int'l Appl.
WO90/08336 7/1990 PCT Int'l Appl.
2067364A 12/1979 United Kingdom.

*Primary Examiner*—Morris H. Nimmo
*Attorney, Agent, or Firm*—Gary L. Griswold; Walter N. Kirn; John C. Barnes

[57] ABSTRACT

A strain relief member is provided for use with a closure member, which strain relief is formed with a web having tabs formed therein, each with a fastener receiving slot and each formed to be bent angularly from the plane of the web to aid in nesting the cables to reduce the space necessary for the joining the cables electrically and providing strain relief.

16 Claims, 5 Drawing Sheets

STRAIN RELIEF DEVICE AND CLOSURE

BACKGROUND OF THE INVENTION

1. Field of the Invention

The present invention generally relates to a cable closure and more particularly to a bracket which provides strain relief and electrical continuity for cables in a cable closure.

2. Description of the Prior Art

Cable closures are well known and it is well known to anchor the cable with respect to the closure structure to avoid displacement of the cable ends from the closure. It is also necessary to provide continuity between the shields of cables which are either spliced or terminated in the closure.

The present device affords a method of providing both strain relief and the electrical continuity of the cable shield. The bracket of the present invention is adapted for use in a pedestal closure, a pole mounted closure or in other splice closures where the ends of the spliced cables are justapositioned.

U.S. Pat. No. 5,059,748 discloses a reenterable splice closure comprising a base and a dome of a typical pedestal type closure. The base 1 is provided with a bonding harness 10. The bonding harness is disposed within the closure such that braided or other straps that connect bond clamps to the cables can be connected to the mounting. In column 5, this patent discusses the preference of a separate strain relief, such as the part 13, and it also states that the bond harness may be of the rigid type in which the mounting has lugs or other parts that connect directly to the bond clamps. In this way, the cables are mechanically secured to the base and may be electrically grounded to one another.

An earlier patent, U.S. Pat. No. 3,725,580, discloses the use of a ring of ductile metal of good conductivity enclosed in a housing. The ring includes a plurality of tangs of generally U-shape and each sized to readily embrace the exposed shielding of a selected drop wire or service wire. The tangs are clinched about the wires to tightly grip the shield. The purpose is to provide electrical continuity.

U.S. Pat. No. 3,431,349 discloses a cable termination closure with a grounding crossbar 20 which extends horizontally across the interior of the upper housing section. This cross bar is a channel shaped metal stamping which is positioned with the flanges depending from the uppermost web and the flanges 22 are provided with apertures 27 to provide for receipt of a tightenable hose clamp which anchors the cable. A grounding ribbon may be wrapped around the cables to make connection with the grounding shield to afford continuity of the ground between adjacent cables supported from the flanges 22 of the crossbar 20.

Other types of strain relief and cable support members are shown in international publication No. WO 90/05401, wherein in FIG. 20A and 20B, a device is shown which may be secured to a sealing means to provide mechanical strength and electrical earth continuity for cables connected thereto by securing means such as bolt 64.

These and other prior art devices may exist but of those known, they are not specifically designed for providing strain relief and electrical continuity and they are not specifically designed to reduce the space needed to terminate the cables and to afford easy connection and retention of the cables to the support member.

The device of the present invention is easily positioned about the cables and retention clips applied to the shields of the cables and to the strain relief device to support the cable and provide electrical continuity between cables.

SUMMARY OF THE INVENTION

The present invention provides a strain relief member for use in a cable closure comprising a web, formed of a ductile conductive material, having a length dimension and a width dimension between opposite sides. The web is formed with a plurality of transverse slots between the opposite sides for receiving fasteners. The web may be formed as an annular ring with the ends joined together. The slots for reception of the fasteners are preferably oblique to reduce the need for precise alignment in making the connection between the fastener and the web. The web has U-shaped cuts, the legs of the U-shaped cuts extend generally parallel to the opposite sides and the bight of connecting portion of the U-shaped cuts extend transversely, to define tabs in the web having the slots therein, which tabs may be bent to positions angularly related to the web.

The present invention also provides a closure comprising a hollow tubular member having a shoulder formed inside of the body and spaced from one end to support a strain relief member comprising an annular ring formed of a ductile conductive material and having transverse slots for receiving fasteners which are placed on the cables for making connection to the shields.

DESCRIPTION OF THE DRAWING

The present invention will be further described with reference to the accompanying drawing wherein.

Figure 1:
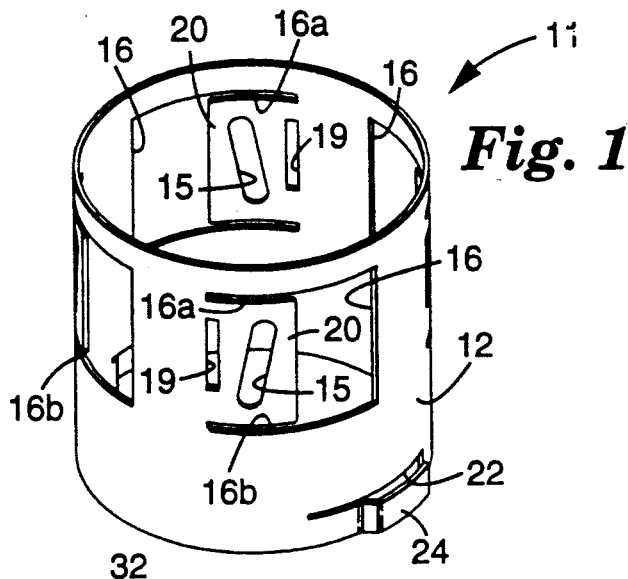
FIG. 1 is a perspective view of a strain relief member according to the present invention.
Figure 2:
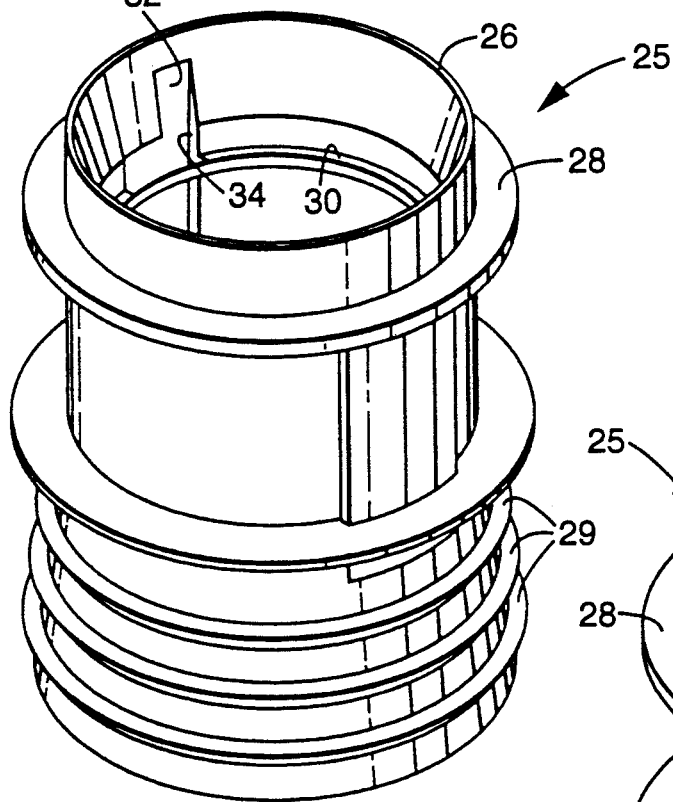
FIG. 2 is a perspective view of a closure member adapted to mate with the strain relief member of FIG. 1.
Figure 3:
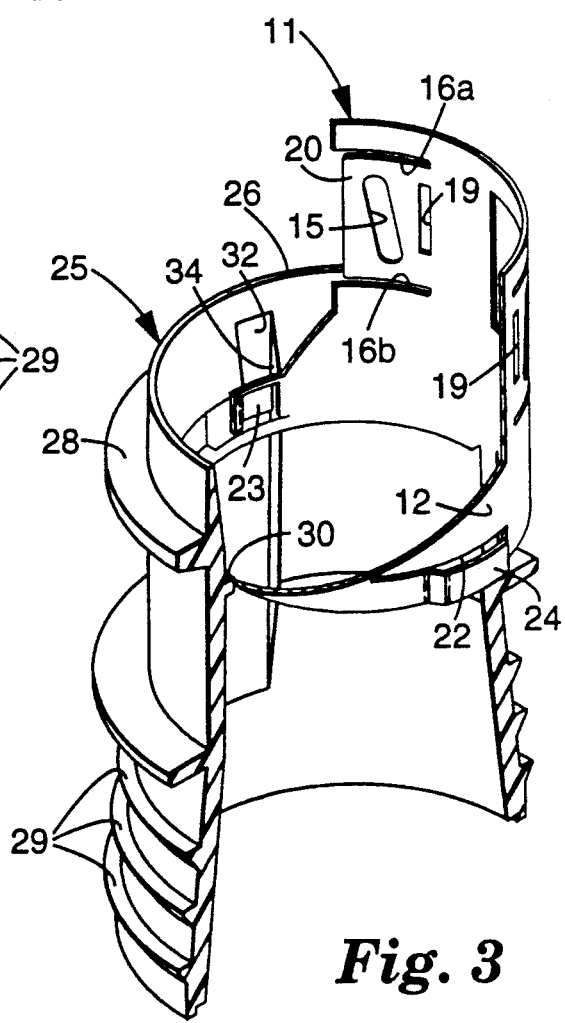
FIG. 3 is a prospective view of the strain relief member of FIG. 1 positioned in the closure member of FIG. 2, with portions of both members broken away to illustrate interior elements.

DETAILED DESCRIPTION OF THE PRESENTLY PREFERRED EMBODIMENTS OF THE PRESENT INVENTION

The present invention will be described in greater detail with reference to the drawing wherein like parts in the several views of the drawing will have the same reference numeral.

The strain relief member 11 of the present invention comprises a web 12 of a conductive ductile metal, which has ends giving it a length dimension. As illustrated in FIG. 1 the web is formed as a continuous member or ring. The web 12 has the ends joined by a weldment to form a generally cylindrical annular member. The weldment is not readily apparent in the drawing as the weldment is formed in the conventional manner and then ground to form a smooth surface giving the web the appearance of a continuous annular member. The web may also be a section of an extruded tube having opposite sides and a length dimension corresponding to the peripheral dimension. The opposite sides of the web 12 provide a width dimension.

The web 12 is formed with a plurality of transverse slots 15 between said opposite sides for receiving fasteners, as will be explained later. The slots 15 have an axis which is oblique to said opposite sides of the web to afford ease in attachment to the fasteners joined to the cable shields.

The web 12 is formed with U-shaped cuts 16 extending therethrough which cuts are made about the slots 15, with the legs 16a and 16b of the U-shaped cuts 16 extending generally parallel to opposite sides of the web 12 and with the bight portion extending transversely of the web. As illustrated in the drawing, the legs 16a and 16b of the cuts 16 extend beyond the slots 15 and terminate generally along a transverse line. An opening 19, having a dimension narrower than that of the slots 15, is positioned between, or extends along the transverse line connecting, the ends of said U-shaped cuts, removing some of the material and affording facile bending of the material within the U-shaped cuts, including the web surrounding the slots. This material within a U-shaped cut 16 defines a tab 20 which may be bent from the plane of the web and positioned angularly to the web 12.

As illustrated in FIGS. 1, 3, 4 and 5, one of the sides of the web 12 is formed with an L-shaped cut 22 and a portion 24 of the web 12, adjacent to the foot and between the leg of the L-shaped cut and the adjacent side, is bent outwardly of the web 12 and parallel to the web surface to form a resilient offset portion defining a stop. Preferably, two L-shaped cuts are formed generally diametrically of each other to provide cooperating stop members, the members 23 and 24, see FIGS. 3, 4 and 5.

The strain relief member 11 is adaptable to fit with a cylindrical closure member such as collar 25. The collar 25 is adapted to fit with a domed cover, not shown, which mates with the end 26 and rests on the outer ring 28. An example of this closure is described in U.S. Pat. No. 4,902,855. The collar 25 illustrated in the drawing has additional outer rings 29 which receive a shrinkable sleeve enclosing the collar 25 and an end seal surrounding the incoming cables and restricting entry of ambient dirt or moisture into the closure. The collar illustrated has a slightly inwardly tapered interior wall surface, from the end 26, narrowing toward a rib or shoulder 30 formed in spaced relationship to the one end 26. A recess 32 is formed in the tapered wall surface which communicates with the shoulder 30. The recess 32 has a portion extending axially of the collar, cutting into the tapered surface of the collar inner wall surface, and a leg portion. The leg portion extends parallel to the shoulder 30 forming a lip to receive and trap the free end of the stop member 23 or 24. A similar recess is formed in the opposite inner wall surface of the collar, to cooperate with the other stop member.

When the strain relief member is placed in the collar 25, the stop members 23 and 24 are directed into the recesses 32, and the strain relief member 11 is rotated, moving the stop member into the leg portion of the recess 32, allowing the free end of the stop member 23 and/or 24 to move past the edge of the recess 32 extending axially and spring into the recess 32 and the free end of the stop members will lock against a surface 34 of the recess, restricting rotation of the strain relief member 11 to free the stop members from the lip of the recess above the shoulder. The shoulder and the lip of the recess restrict axial movement of the web 12.

Figure 4:
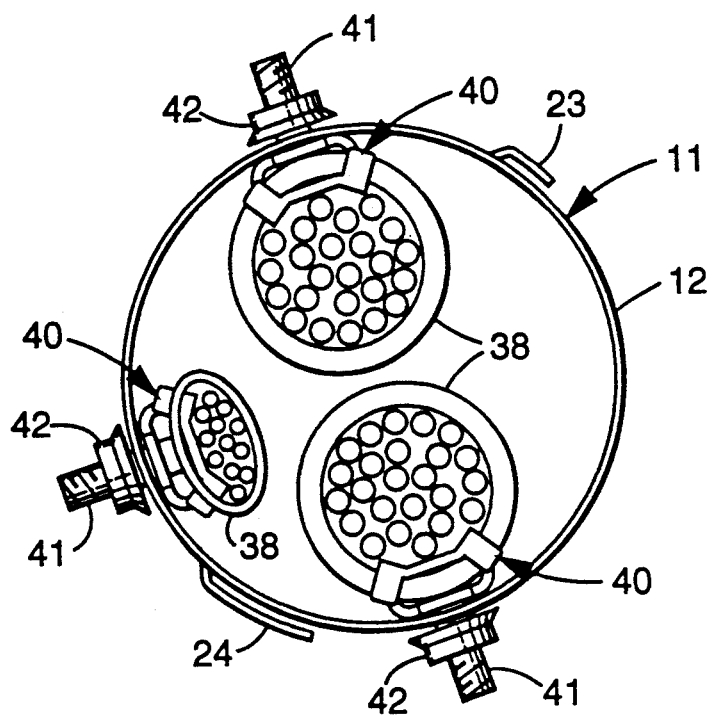
FIG. 4 is a plan view of the strain relief member of the present invention and a plurality of cables connected thereto.
Figure 5:
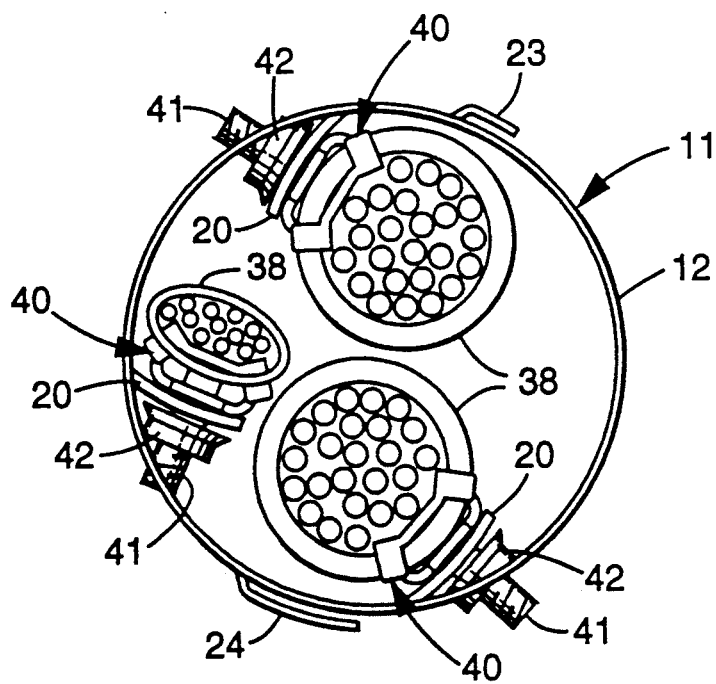
FIG. 5 is a plan view of the strain relief member with a plurality of cables connected thereto and positioned to reduce the area occupied by the same.

As illustrated in FIGS. 4 and 5, a number of cables 38 are inserted into the strain relief member 11 and a connector 40 is joined to each of the cables. The connectors each include two parts, one of which is forced into the cable to engage the inner surface of the cable conductive shield. This part is formed with a threaded stud 41 which receives the second part of the fastener and a locking nut 42. Before the nut 42 is threaded onto the stud 41, the stud is positioned through a slot 15 of the strain relief member 11. Both parts of the connector 40 have teeth which bite into the shield and sheath of the cable when forced toward contact with one another, as the stud 41 receives the threaded fastener or nut 42. The connector 40 and the strain relief member are conductive, thus the shields of the cables 38 are joined together electrically. Examples of such connectors are described in U.S. Pat. Nos. 3,778,749 and 4,561,708.

As shown in FIG. 4, the studs 41 project beyond the strain relief member upon initial assembly of the connectors, cables and to the strain relief member. The assembly is accomplished with ease as the fasteners are all positioned for ease of access. To leave the studs in this position would interfere with the assembly of a dome cover onto the closure collar, which cover has an inner diameter not substantially greater than the outside dimension of the annular strain relief member 11. Thus, the tabs 20 of the strain relief member are readily bent from their position in the plane of the web 12 to a position angularly related thereto, to dispose the cables in a nested position within the strain relief member 11 and to draw the ends of the studs 41 into the strain relief member and reduce the peripheral dimension about the strain relief member 11, allowing the dome cover to be positioned over the strain relief member and cables.

Figures 6, 7:
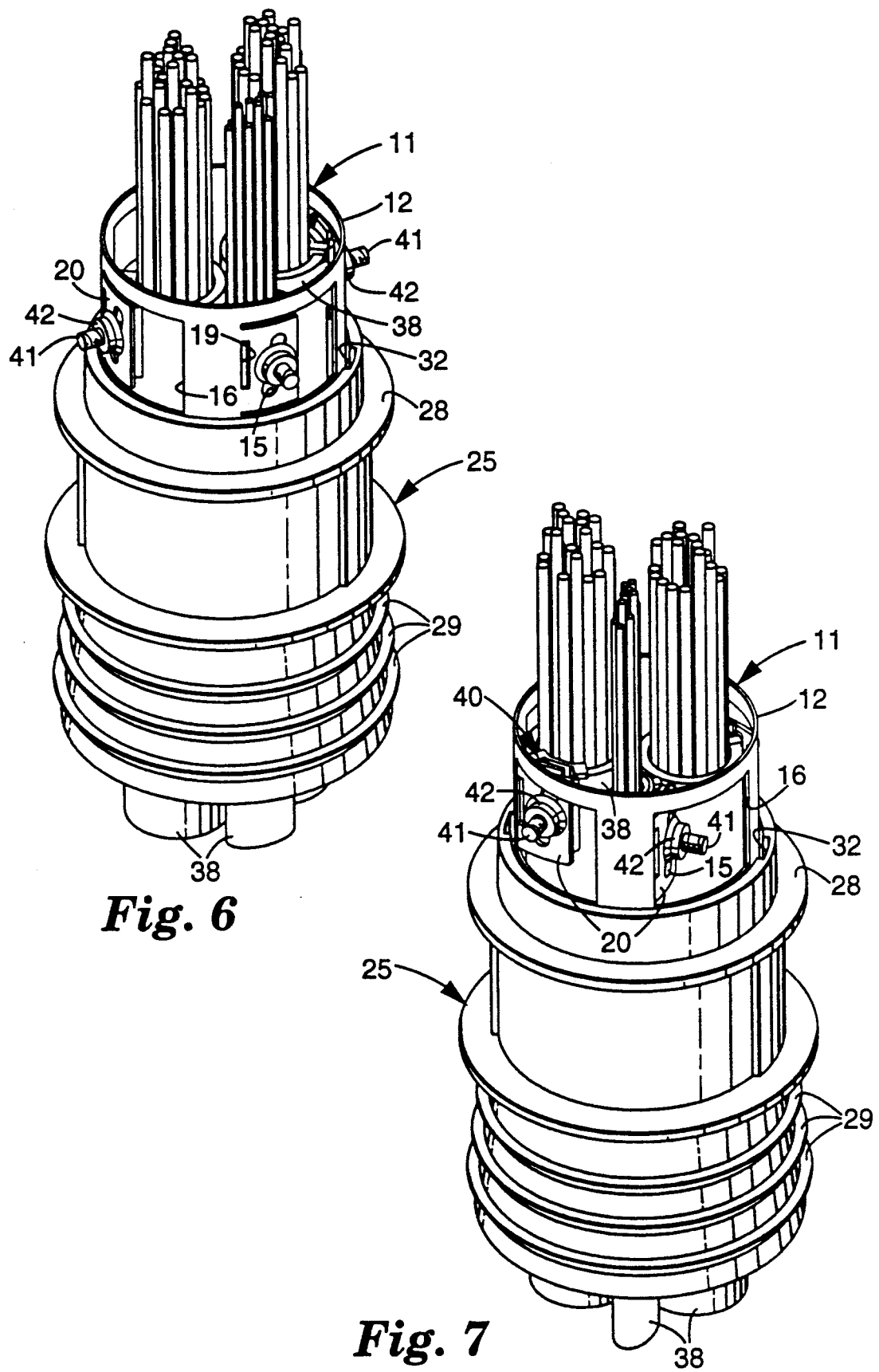
FIG. 6 is a perspective view of a closure member, strain relief member and cables connected as illustrated in FIG. 4.
FIG. 7 is a perspective view of a closure member, strain relief member and cables connected as illustrated in FIG. 5.

FIGS. 6 and 7 illustrate, in perspective, the cables 38 with the individual wires thereof extending through the collar 25 and the strain relief member 11. FIG. 6 corresponds to FIG. 4 with the tabs 20 disposed in the plane of the strain relief member 11 for ease in making the connection, with the nuts 42 being placed onto the studs from the outer surface of the strain relief member. FIG. 7 illustrates the cables 38 mounted on the tabs 20 by connectors 40, when the tabs are disposed at an angle t o the web 12 as illustrated in FIG. 5.

Figures 8, 9:
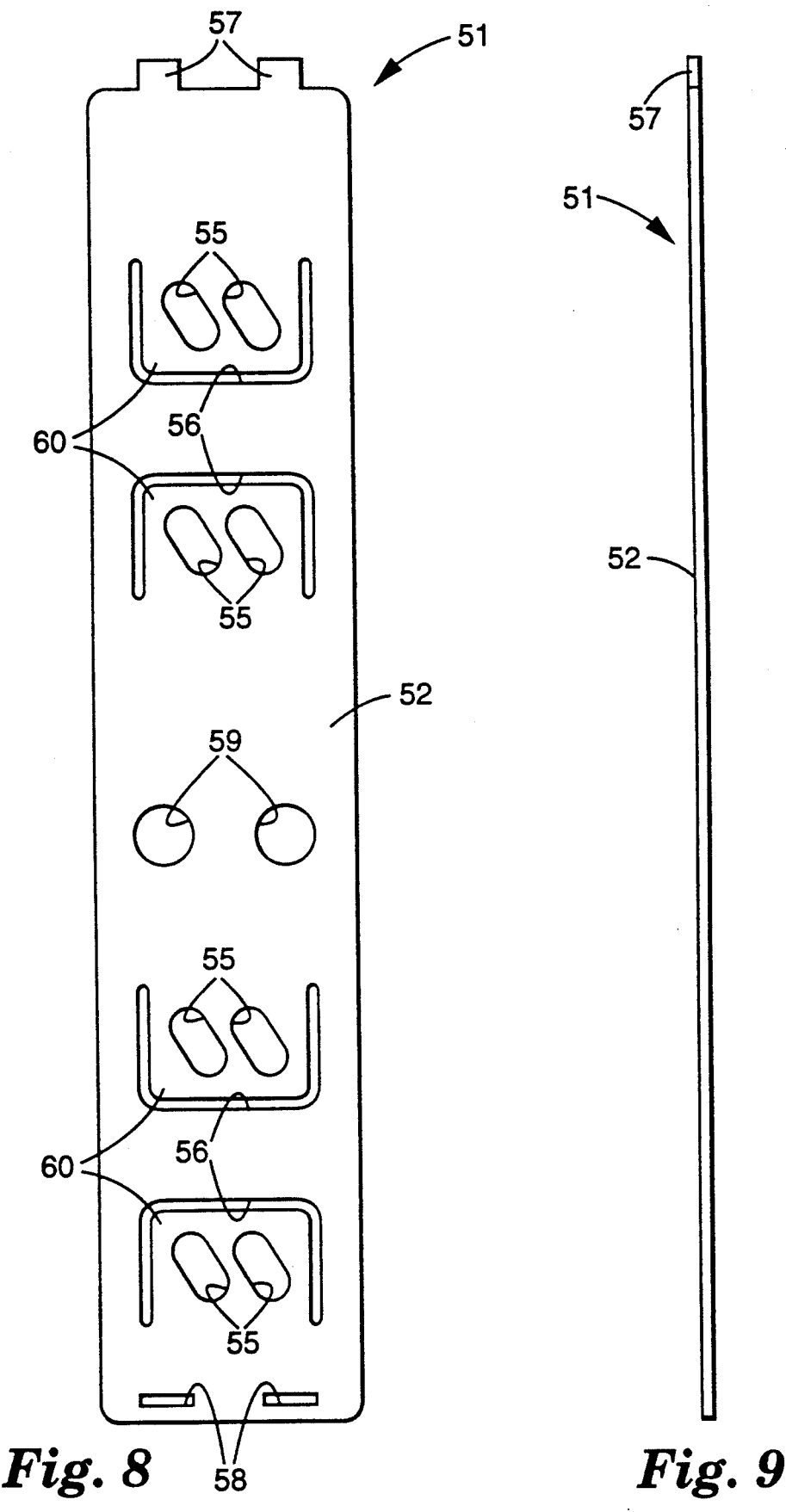
FIG. 8 is a plan view of a second embodiment of a strain relief member formed according to the present invention.
FIG. 9 is a side view of the strain relief member of FIG. 8.
Figure 10:
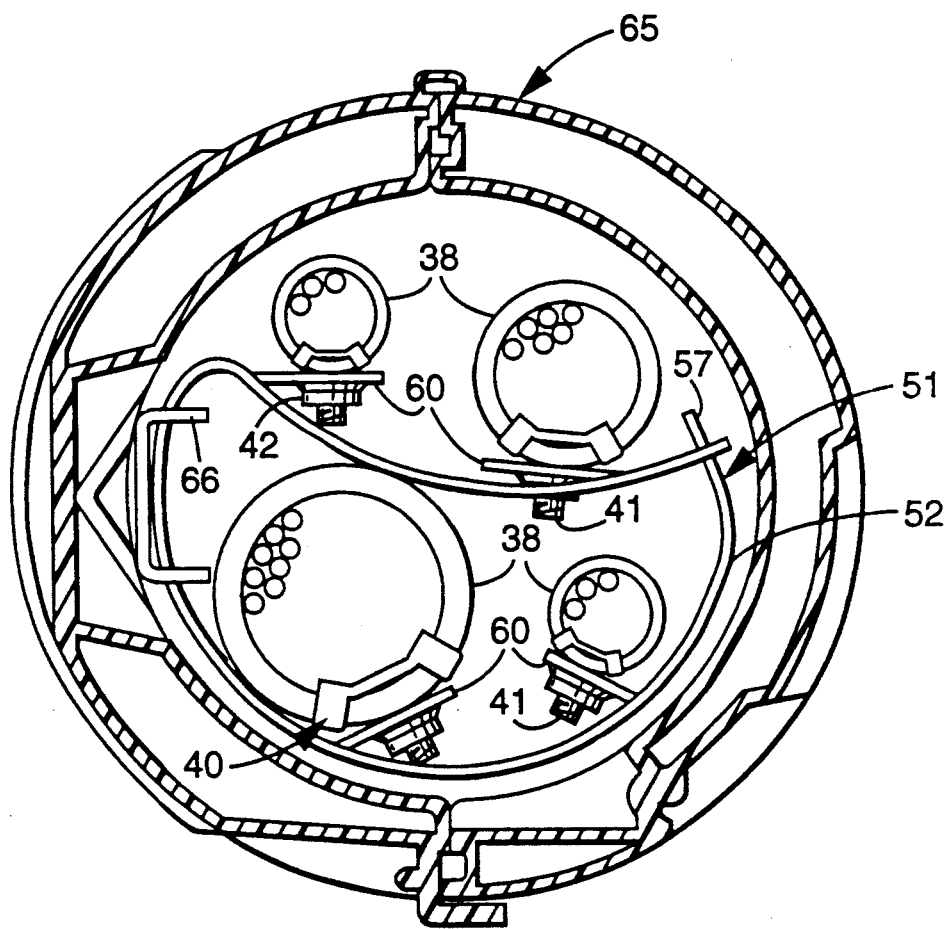
FIG. 10 is a sectional view of a closure member, a strain relief member as shown in FIG. 8 and cables in schematic form showing the connection of the cables to the strain relief member to reduce the space required with a strain relief member of the present invention.

FIGS. 8 and 9 illustrate a second embodiment of the web of a strain relief member according to the present invention. In these figures the strain relief member 51 comprises a web 52 having a plurality of slots 55 disposed with their axes oblique to the sides of the web 52. The web is formed with U-shaped cuts 56 about the slots to form tabs 60 which may be bent from the plane of the web to position the connectors and cables joined thereby in a nested configuration. In this embodiment, the ends of the web 52 are formed respectively with tongues 57 and slots 58 to join the ends together in the desired configuration. Holes 59 may also be formed in the web 52 to support the web in a collar. In FIG. 10, a cross section of a closure member 65 is illustrated with a strain relief member 51 disposed therein. The web 52 is threaded through slots in the flanges of a channel shaped grounding strap 66 in the closure 65 and the ends of the web are joined to form a continuous member. Bolts, not shown, are positioned through the grounding strap 66 and the holes 59 to hold the web in place and assure electrical continuity with an external hanger. A plurality of cables 38 are positioned in the closure member 65 and the cables 38 are joined by connectors to the tabs 60, which are then bent to angular positions in relationship to the web 52 to nest the cables, provide strain relief for the cables and join the shields thereof electrically. In this embodiment, the fasteners are all initially positioned in the same direction for ease of fastening the cables to the strain relief member.

Suitable materials for the webs 12 and 52 are cartridge brass such as #270 brass with tin plating, other copper alloys, aluminum or steel. The slots 15 and 55 have a width of 0.20 inches (5.1 mm) to receive the studs of the common fasteners, and the tabs 20 and 60 have a width dimension of about 1 inch (25 to 28.2 mm) and are formed with one or two slots, 15 or 55 as illustrated. The outer diameter of the annular strain relief member 11 as illustrated in FIG. 1 is 2.86 inches (72.6 mm) providing a relatively small strain relief member for the cables. The width of the web 12 is 2.6 inches (66.6 mm).

Having thus described the present invention by way of two embodiments, it will be understood that variations and additional modifications may be made without departing from the spirit of the invention as claimed in the appended claims.

What is claimed is:

1. A strain relief member for use in a cable closure comprising a tubular closure member, said strain relief member comprising a web, formed of a ductile conductive material, having a length dimension and a width dimension between opposite sides, said web being formed with a plurality of transverse slots between said opposite sides for receiving fasteners, and said web having U-shaped cuts through said web and about said slots each U-shaped cut having a pair of generally parallel with the legs extending generally parallel to said opposite having a connecting portion from said legs and extending transversely of said web to define tabs in said web having said slots therein, which tabs may be bent to positions angularly related to the web.

2. A strain relief member according to claim 1 wherein said web is in the form of an annular ring.

3. A strain relief member according to claim 1 wherein said slots have an axis which is oblique to the opposite sides of said web.

4. A strain relief member according to claim 1 wherein a pair of said slots, having an axis which is oblique to said opposite sides, is positioned on each tab.

5. A strain relief member according to claim 1 wherein an opening having a dimension narrower than said slots extends between the open ends of each U-shaped cuts to afford facile bending of the tab within the U-shaped cuts, including the web surrounding the slots, to a position angularly related to the web.

6. A strain relief member according to claim 2 wherein said ring is formed by joining the ends of said web by a weldment.

7. A strain relief member according to claim 5 wherein said web ends that are joined together by a weldment.

8. A strain relief member according to claim 3 wherein one of the sides of said web is formed with an L-shaped cut with the portion of the web between the leg of the L-shaped cut and said one side of the web is bent outwardly of the web to define a stop.

9. A strain relief member according to claim 5, wherein at least three slots are formed in the web.

10. A strain relief member according to claim 1 wherein the web is formed with ends shaped to connect together to form a continuous member.

11. A closure for a cable termination including a hollow tubular member having opposite open ends and a rigid body, a shoulder formed on the inner surface of said body and spaced from one end to reduce the inner diameter of the tubular member in the area of the shoulder, and a strain relief member comprising a web formed of a ductile material and having a length dimension and a width dimension between opposite sides, said web having a plurality of transverse slots between said opposite sides for receiving fasteners, said web being positioned with one side resting against said shoulder and said transverse slots extending between said one end of said body and the side of the web opposite said one side, and said web being formed with U-shaped cuts through said web and about said slots each U-shaped cut having a pair of generally parallel legs extending generally parallel to said opposite sides and having a transversely of said web to define tabs in said web having the slots therein, which tabs may be bent to positions angularly related to the web and to the end of said body.

12. A closure according to claim 11 wherein said web is formed as a cylindrical member having an outer dimension to slide into and generally correspond to the inner surface of the body.

13. A closure according to claim 11 wherein said slots have an axis which is oblique to said opposite sides.

14. A closure according to claim 13 wherein an opening having a dimension narrower than said slots extends between the open ends of said U-shaped cuts to afford facile bending of the material defining the tabs within the U-shaped cuts to a position angularly related to the web.

15. A closure according to claim 12 wherein said web has ends joined together by a weldment.

16. A closure according to claim 15 wherein said body has axially extending recesses on the inner surface, from said one end of the body to the shoulder and extending along the shoulder, and said web is formed with an offset projecting from the web adjacent to said one side for locking in said recess upon insertion of said strain relief member into said one end of said body with the one side resting on the shoulder and the offset positioned in an axial portion of the recess and rotated into the recess.

* * * * *